(12) United States Patent
Kim et al.

(10) Patent No.: US 9,796,050 B2
(45) Date of Patent: Oct. 24, 2017

(54) METHOD FOR MANUFACTURING DISPLAY PANEL AND DISPLAY PANEL MANUFACTURED BY THE METHOD

(71) Applicant: Samsung Display Co., Ltd., Yongin (KR)

(72) Inventors: Jang Hyun Kim, Hwaseong-si (KR); Min Su Kim, Seoul (KR); Tae Woon Cha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 253 days.

(21) Appl. No.: 14/681,492

(22) Filed: Apr. 8, 2015

(65) Prior Publication Data
US 2016/0152018 A1 Jun. 2, 2016

(30) Foreign Application Priority Data

Nov. 27, 2014 (KR) .................. 10-2014-0167278

(51) Int. Cl.
| | |
|---|---|
| *B23K 26/38* | (2014.01) |
| *B23K 26/00* | (2014.01) |
| *B32B 38/00* | (2006.01) |
| *G02F 1/1333* | (2006.01) |
| *B32B 37/00* | (2006.01) |
| *B23K 101/36* | (2006.01) |
| *B23K 103/00* | (2006.01) |

(52) U.S. Cl.
CPC .......... *B23K 26/38* (2013.01); *B23K 26/0006* (2013.01); *B23K 26/0087* (2013.01); *B23K 26/0093* (2013.01); *G02F 1/133351* (2013.01); *B23K 2201/36* (2013.01); *B23K 2203/54* (2015.10); *B23K 2203/56* (2015.10); *B32B 37/0076* (2013.01); *B32B 38/105* (2013.01); *B32B 2457/20* (2013.01)

(58) Field of Classification Search
CPC ............ B23K 26/0087; B23K 26/0093; G02F 1/133351
See application file for complete search history.

(56) References Cited

FOREIGN PATENT DOCUMENTS

| KR | 10-2004-0017819 | 2/2004 |
|---|---|---|
| KR | 10-2012-0049707 | 5/2012 |

*Primary Examiner* — Mark A Osele
*Assistant Examiner* — Christopher C Caillouet
(74) *Attorney, Agent, or Firm* — H.C. Park & Associates, PLC

(57) ABSTRACT

A method for manufacturing a display panel includes providing a mother substrate that includes a display area and a non-display area, and includes a first substrate, a second substrate facing the first substrate, and a sealant provided between the first substrate and the second substrate, generating a crack on the sealant through irradiation of laser onto the sealant between the first substrate and the second substrate, and cutting a part of the second substrate and a part of the sealant at a position corresponding to the crack.

18 Claims, 22 Drawing Sheets though the first substrate and the second substrate; and cutting a part of the second substrate and a part of the sealant using a cutting wheel that is positioned to correspond to the crack.

METHOD FOR MANUFACTURING DISPLAY PANEL AND DISPLAY PANEL MANUFACTURED BY THE METHOD

CROSS REFERENCE TO RELATED APPLICATIONS

This application claims priority from and the benefit of Korean Patent Application No. 10-2014-0167278, filed on Nov. 27, 2014, which is hereby incorporated by reference for all purposes as if fully set forth herein.

BACKGROUND

Field

Exemplary embodiments relate to a method for manufacturing a display panel and a display panel manufactured using the method.

Discussion of the Background

Recently, there has been a rise in demand for a slim large-sized display device in the market. Because a CRT (Cathode Ray Tube) device in the related art is unable to fully satisfy such a demand, there has been a sharp rise in demand for a flat-panel display, such as a PDP (Plasma Display Panel), a PALC (Plasma Address Liquid Crystal display panel), an LCD (Liquid Crystal Display), or an OLED (Organic Light Emitting Diode).

Among the flat-panel display devices, an LCD is a display device that operates when voltages are applied to electrodes provided on upper and lower portions of glass substrates between which liquid crystals are inserted. When the voltages are applied, orientations of the liquid crystal molecules are changed, and the quantity of light that penetrates the liquid crystals is controlled.

In accordance with consumer needs, there is demand to minimize a non-display area, that is, a bezel area of the display devices. Further, there is demand for a reliable method for manufacturing a display panel having a minimized bezel area and superior durability.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method for manufacturing a display panel and a display panel manufactured by the method, the display panel having a narrow bezel.

Exemplary embodiments of present invention also provide a reliable method for manufacturing a display panel having a narrow bezel.

Additional aspects will be set forth in the detailed description which follows, and, in part, will be apparent from the disclosure, or may be learned by practice of the inventive concept.

An exemplary embodiment of the present invention discloses a method for manufacturing a display panel that includes: providing a mother substrate including a display area and a non-display area, and includes a first substrate, a second substrate facing the first substrate, and a sealant provided between the first substrate and the second substrate configured to seal the first substrate and the second substrate; generating a crack on the sealant through laser irradiation of the sealant between the first substrate and the second substrate; and cutting a part of the second substrate and a part of the sealant using a cutting wheel that is positioned to correspond to the crack.

An exemplary embodiment of the present invention also discloses a method for manufacturing a display panel including: providing a mother substrate which includes a display area and a non-display area, and includes a first substrate, a second substrate that faces the first substrate, and a sealant provided between the first substrate and the second substrate to seal the first substrate and the second substrate; generating a crack on the sealant through laser irradiation of the sealant between the first substrate and the second substrate; and cutting a part of the second substrate, a part of the sealant, and a part of the first substrate using a cutting wheel that is positioned to correspond to the crack.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
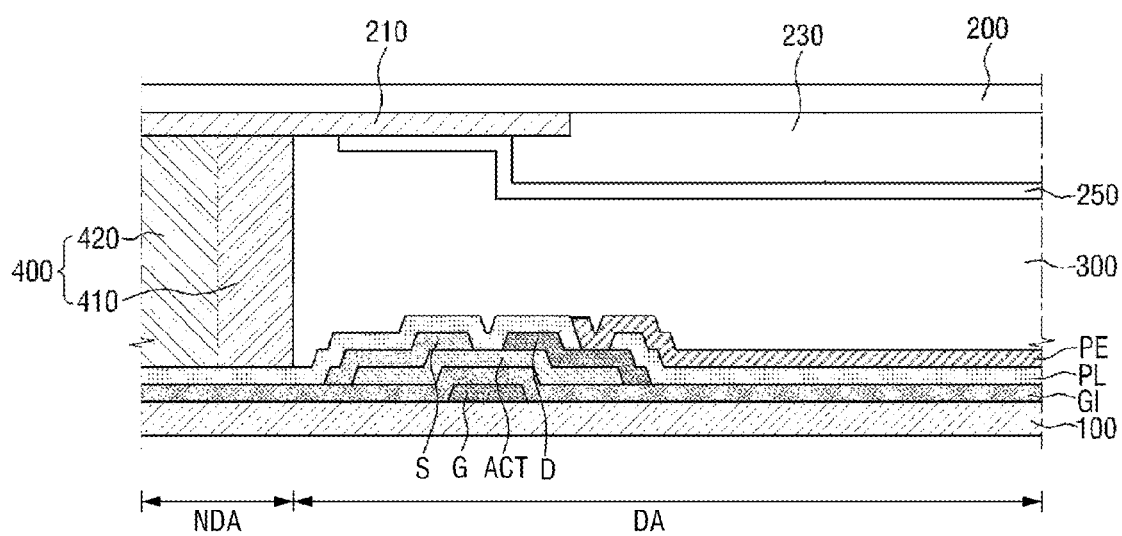
FIG. 1 is a cross-sectional view of a mother substrate according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, embodiments of the present invention will be described with reference to the accompanying drawings.

FIG. 1 is a cross-sectional view of a mother substrate according to an exemplary embodiment of the present invention.

Referring to FIG. 1, the mother substrate may include a display area DA and a non-display area NDA. The mother substrate may further include a first substrate 100 and a second substrate 200 arranged to face each other. A display panel may be formed between the first substrate 100 and the second substrate 200. Further, a sealant 400 for sealing internal elements of a display panel inside the device may be disposed between first substrate 100 and second substrate 200.

The first substrate 100 may be a TFT (thin film transistor) substrate. For example, a gate electrode G may be positioned on the first substrate 100, and a gate insulating layer GI may be positioned on the gate electrode G and the first substrate 100. A semiconductor layer ACT may be positioned in an area of the gate insulating layer GI that at least partially overlaps the gate electrode G, and a source electrode S and a drain electrode D may be positioned to be spaced apart from each other on the semiconductor layer ACT. A passivation layer PL may be positioned on the gate insulating layer GI, the source electrode S, the semiconductor layer ACT, and the drain electrode D. A pixel electrode PE may be positioned on the passivation layer PL through a contact hole that exposes at least a part of the drain electrode and, thus, may be electrically connected to the drain electrode D.

The second substrate 200 may be a color filter substrate. For example, the second substrate 200 may be made of a transparent insulating material, such as glass or plastic. A black matrix 210 for preventing light leakage, a color filter 230 having, for example, red (R), green (G), and blue (B) color filters (not shown), and a common electrode 250, which is an electric field generation electrode formed of a transparent conductive oxide such as indium tin oxide (ITO) or indium zinc oxide (IZO), may be provided on the lower surface of the second substrate 200.

Further, at least one of the first substrate and the second substrate may include a light permeable material. If a crack is generated in a surface between the sealant and the second substrate or a surface between the sealant and the first substrate by irradiating the surface with laser (to be described later), laser irradiation may be performed in the direction of the sealant by penetration of the first substrate or the second substrate in the area of the light permeable material.

A liquid crystal layer 300 that is sealed by the sealant 400 may be interposed between the first substrate 100 and the second substrate 200. The liquid crystal layer 300 serves to rotate a polarization axis of incident light (to be described layer), and may be aligned in a predetermined direction. For example, the liquid crystal layer 300 may be in a twisted nematic (TN) mode having positive dielectric anisotropy, a vertical alignment (VA) mode, or a horizontal alignment such as in-plane switching (IPS) or fringe field switching (FFS) mode, but is not limited thereto.

The black matrix 210 may be formed on a surface of the second substrate 200 that faces the first substrate 100. The black matrix 210 may be formed in a position that corresponds to the sealant 400 to prevent the sealant 400 from being visually recognized from outside the display. Additionally, the black matrix 210 may cover a part of the display area DA. In other words, the black matrix 210 may cover the gate electrode G, parts of the source electrode S and the drain electrode D, and a part of the semiconductor layer ACT, which correspond to an area except for the portion where the pixel electrode PE of the display area DA is formed.

The sealant 400 between the first substrate 100 and the second substrate 200 may contact and attach to the first substrate 100 and the second substrate 200 to seal the internal elements so that the internal elements are not exposed to outside contaminants. The sealant 400 may include UV-curing resin or thermosetting resin and, thus, may be cured when UV light or heat is applied thereto. That is, the sealant may, in the case of the UV-curing resin, be cured by irradiating the sealant with UV light having a proper wavelength or, in the case of the thermosetting resin, applying heat at a sufficient temperature for a sufficient time.

The sealant 400 may be formed in outer regions of the first substrate 100 and the second substrate 200. In other words, the sealant 400 may be positioned between the first substrate 100 and the second substrate 200 and may be formed along the edge, that is, the periphery of the non-display area. The sealant 400 may be formed on the first substrate 100 through a dispenser printing method, but is not limited thereto. However, due to errors in sealant deposition processes, such as variations in spreading pressure and/or a discharge amount of the sealant in a sealant forming process, the sealant 400 may not be formed with a uniform width, or a specific portion of the sealant may be formed with a relatively thick or thin thickness. However, according to an exemplary embodiment of the present invention, since the first substrate 100 and the second substrate 200 can be formed with a uniform thickness by pressure applied thereto during a bonding process, they may be formed having a predetermined margin before they are bonded together. Accordingly, the sealant 400 may be formed having a height that is higher than the other constituent elements before being cured or set.

The process of preparing the mother substrate may include forming a TFT array on the first substrate 100, forming a color filter 230 on the second substrate 200, forming an alignment layer (not illustrated), spreading the sealant 400 and forming a spacer (not illustrated), dropping liquid crystals that constitute the liquid crystal layer 300, bonding the first substrate 100 and the second substrate 200 to each other, and curing or setting the sealant 400.

Figure 2:
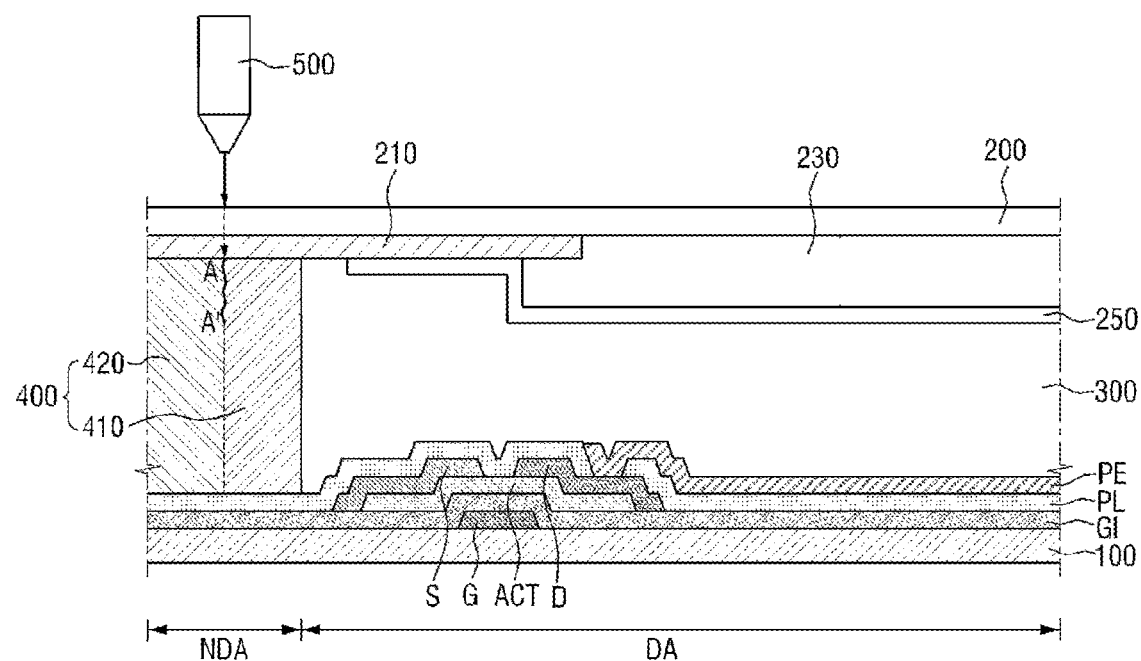
FIGS. 2, 3, and 4 are cross-sectional views schematically illustrating a method for manufacturing a display panel according to an exemplary embodiment of the present invention.
Figure 3:
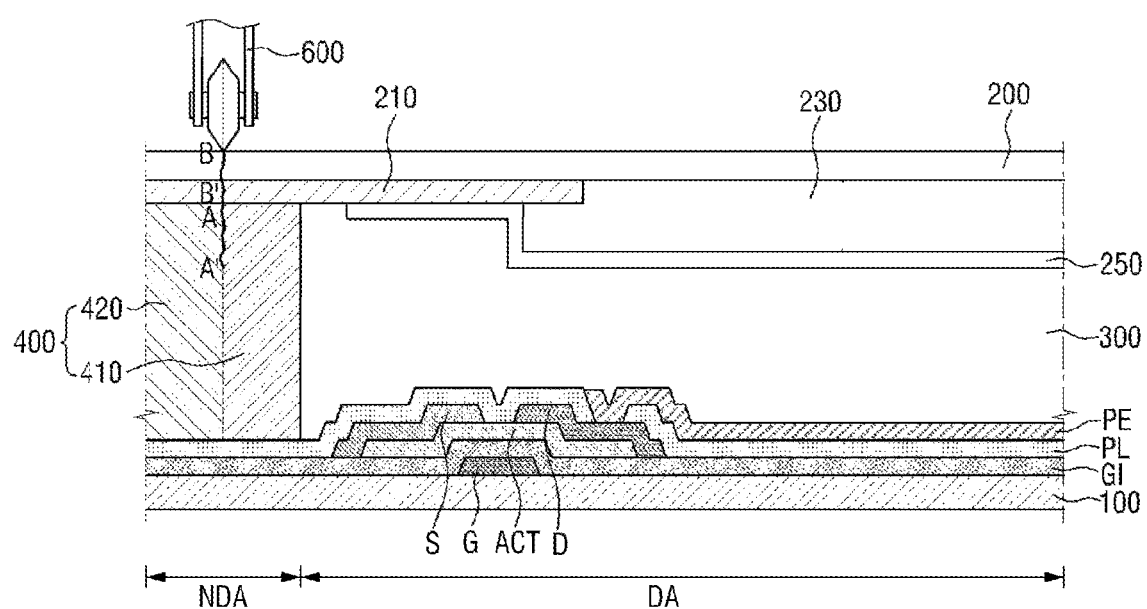
Figure 4:
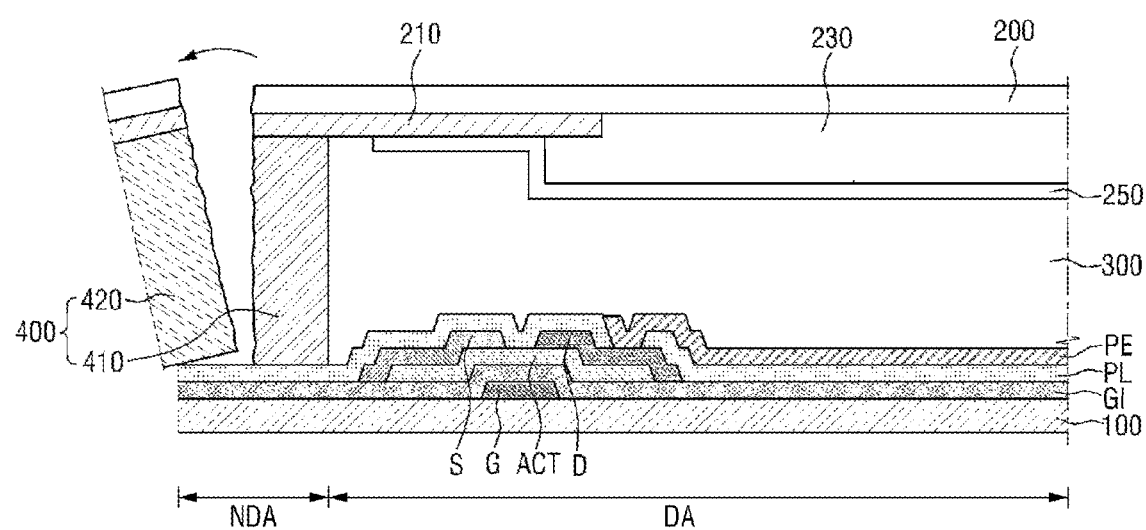

FIGS. 2 to 4 are cross-sectional views schematically illustrating a method for manufacturing a display panel according to an exemplary embodiment of the present invention. Referring to FIGS. 2 to 4, a method for manufacturing a display panel will be described in more detail.

The method may include generating a crack on the sealant 400 between the first substrate 100 and the second substrate 200 of the prepared mother substrate by laser irradiation of the sealant 400. Accordingly, as shown in FIG. 2, a crack AA' may be generated.

As described above, the sealant 400 may be thickly formed in a predetermined margin area. When bonding the first substrate 100 and the second substrate 200 to each other, the sealant may spread within and outside the predetermined margin area, and the spread portion of the sealant may be removed by cutting. In particular, the first substrate 100 and the second substrate 200 may have a large area with the predetermined margin. Thus, excess sealant may be removed in order to manufacture a display panel that is to be finally used.

That is, an area containing the sealant may be removed except for the area of the sealant 400 large enough to protect the interior elements from outside contaminants and to prevent the interior elements from leaking to the outside.

In the comparative case of using a cutting device to cut the excess portion of sealant, a crack may be generated and propagated to finally sever the excess portion. However, since the crack may propagate in an unwanted direction, the gap between the substrates may not be sealed completely or may not be sealed enough to secure reliability, and this may cause production of an inferior product. If the sealant is designed to have a large margin in order to avoid this problem, the non-display area, that is, the bezel area, may be increased on the product. In other words, the sealant 400 and the first and second substrates 100 and 200 come in close contact with each other, and in the case of using a typical cutting method, it may be difficult to solve the problem that the crack propagates in unwanted direction.

According to an exemplary embodiment of the present invention, a crack can be generated in the sealant 400 in advance through irradiation of laser onto the sealant 400 between the first substrate 100 and the second substrate 200. Generating the crack may include weakening an adhesive force of the sealant through selective modification of a partial area of the sealant 400 between the first substrate 100 and the sealant 400. Thus, it may be possible to direct propagation of the generated crack in a direction by generating the crack in advance with a predetermined depth accurately in a position to be cut.

As shown in FIG. 2, generating the crack may be performed by laser irradiation from an upper portion of the second substrate 200 toward the sealant 400 using a laser irradiation device 500. In other words, a crack can be generated from a surface of the sealant 400 that comes in contact with the second substrate 200 toward the first substrate 100 through laser irradiation using the laser irradiation device 500.

Generating the crack may include modifying an adhesive force between the sealant 400 and the first substrate 100 or the second substrate 200 through laser irradiation of the sealant 400. More specifically, the adhesive force formed between the sealant 400 and the first substrate 100 or between the sealant 400 and the second substrate can be modified through focusing laser light in an area between the sealant 400 and the first substrate 100 or between the sealant 400 and the second substrate 200 in the mother substrate. As a result, the crack can be generated simultaneously with the modification of the adhesive force. That is, the modification and cutting of the surface of the sealant 400, that is, the generation of the crack, may be performed earlier than the cutting of a portion that is exposed to an outside. This may be accomplished by focusing the laser onto a portion where the sealant 400 and the first substrate 100 come in contact with each other or a portion where the sealant 400 and the second substrate 100 come in contact with each other.

The sealant 400 may include a first area 410 that is positioned inside the mother substrate and a second area 420 that is positioned outside the mother substrate. That is, on the final manufactured display panel, the first area 410 of the sealant 400 remains in the product and serves to seal and protect the elements inside the display panel. The second area 420 is an excess area in a margin that is created during the process of manufacturing the product, and thus may be defined as an area that is removed from the final product. Accordingly, generating the crack may be performed through irradiation of a laser onto a boundary between the first area 410 and the second area 420 of the sealant 400.

Next, as shown in FIG. 3, a part of the second substrate 200 and a part of the sealant 400 are cut using a cutting wheel 600 that is positioned to correspond to a portion where a crack AA' is formed. The surface of the sealant 400 where the crack AA' has been generated has already been modified, and during the cutting of the second substrate 200 using the cutting wheel 600, a new crack BB' propagates from an upper end of the second substrate to the portion where the crack AA' has been generated to cause the intended cutting to be performed more accurately.

The cutting may be performed in a manner in which part of the second substrate 200 is cut by the cutting wheel 600, and the crack AA' that is formed on the sealant 400 extends from the second substrate 200 toward the first substrate 100. Accordingly, using the cutting wheel 600, the second substrate 200 is cut and the crack BB' is generated on the second substrate, and the crack AA' of the sealant 400 extends to cut the sealant 400. The crack BB' that is generated by the cutting wheel 600 propagates to the previously-generated crack AA', and the crack further propagates from crack AA' to precisely cut the mother substrate.

The cutting wheel 600 is a device that has widely been used in the art to remove a partial area of the display panel in the process of manufacturing the display panel, and thus more detailed explanation thereof will be omitted.

Next, as shown in FIG. 4, the cut portion may be removed. Specifically, a part of the second substrate 200 and the second area 420 of the sealant 400 may be removed together. Although not separately illustrated, the first substrate 100 may include a drive portion having a driver IC positioned on the non-display area 420 to drive the display panel. The drive elements positioned in the drive portion may be electrically connected to the elements on the display area DA to transfer signals, and thus an image to be displayed may be displayed.

Through the cutting, a part of the second substrate 200 and a part of the sealant 400 on the drive portion may be removed. Accordingly, the first substrate 100 may include an area that is not covered by the second substrate 200, and the drive portion may be positioned on the non-covered area.

Figure 5:
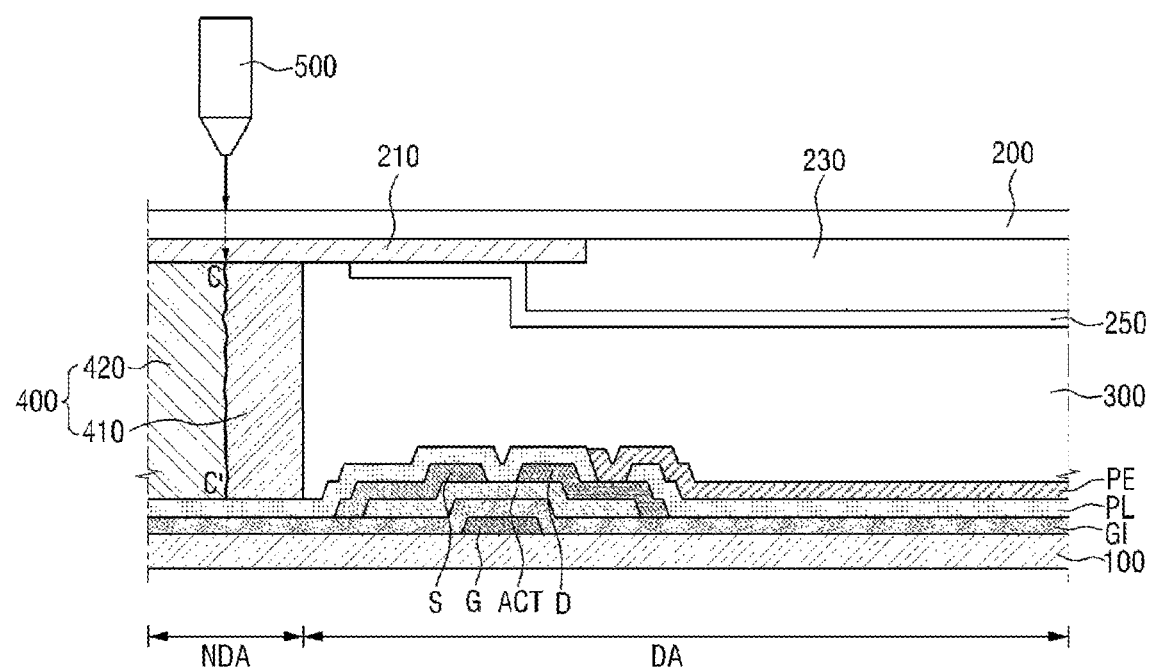
FIGS. 5, 6, and 7 are cross-sectional views schematically illustrating a method for manufacturing a display panel according to another exemplary embodiment of the present invention.
Figure 6:
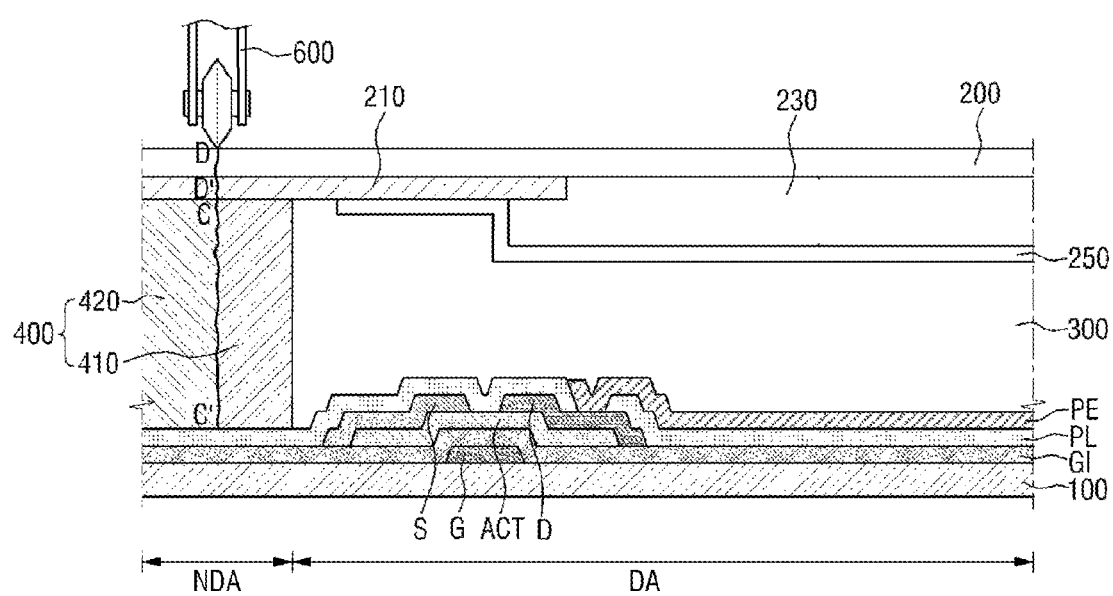
Figure 7:
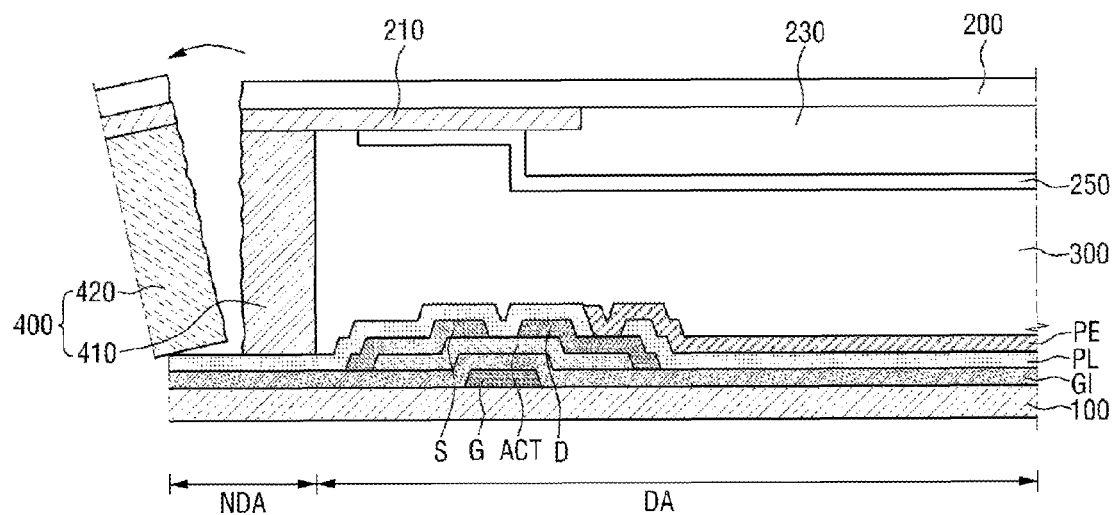
Figure 8:
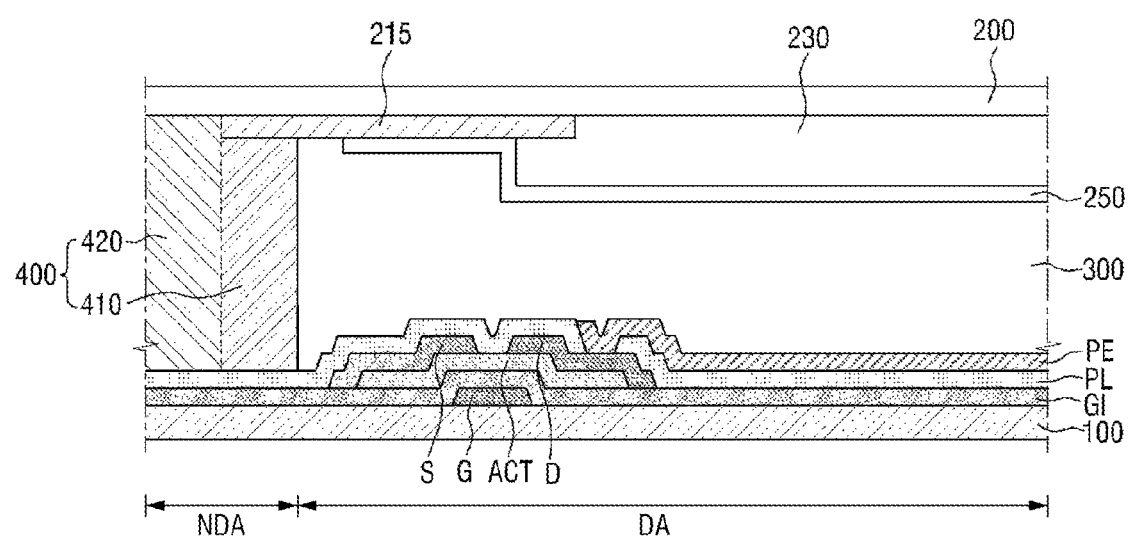
FIGS. 8, 9, 10, and 11 are cross-sectional views schematically illustrating a method for manufacturing a display panel according to another exemplary embodiment of the present invention.

FIGS. 5 to 7 are cross-sectional views schematically illustrating a method for manufacturing a display panel according to an exemplary embodiment of the present invention.

Referring to FIG. 5, a crack may be generated on a boundary between the first area 410 and the second area 420 of the sealant by a laser irradiation device 500. The crack CC' may be formed from a surface on which the first substrate 100 and the sealant 400 come in contact with each other toward a surface on which the second substrate 200 and the sealant 400 come in contact with each other. That is, the first area 410 and the second area 420 on the sealant 400 may be completely separated from each other by the laser irradiation device 500.

Next, as shown in FIG. 6, the second substrate 200 may be cut using the cutting wheel 600 to generate a crack DD', and the crack DD' may extend to the crack CC' that was previously-generated. Accordingly, as shown in FIG. 7, a part of the second substrate 200 and a part of the sealant 400 may be removed.

Since other configurations may have components similar to those as described above, any duplicate explanation thereof will be omitted for brevity.

FIGS. 8 to 11 are cross-sectional views schematically illustrating a method for manufacturing a display panel according to an exemplary embodiment of the present invention.

Referring to FIGS. 8 to 11, a black matrix 215 may be formed on a surface of the second substrate 200 that faces the first substrate 100 to cover only an upper side of the first area 410 on the sealant 400. In other words, the black matrix 215 may partially cover other elements on the display area DA, but the area that covers the upper side of the sealant 400 may cover only the first area 410 of the sealant 400. That is, the black matrix 215 may not be positioned on the second area 420.

Through the arrangement of the black matrix 215 as described above, laser that is radiated on the sealant 400 disposed on the second substrate can be accurately radiate onto a boundary portion between the first area 410 and the second area 420. Further, since the black matrix is not positioned on the portion irradiated with the laser, the laser can reach the sealant 400 that is positioned inside more effectively to improve crack generation efficiency.

Figure 9:
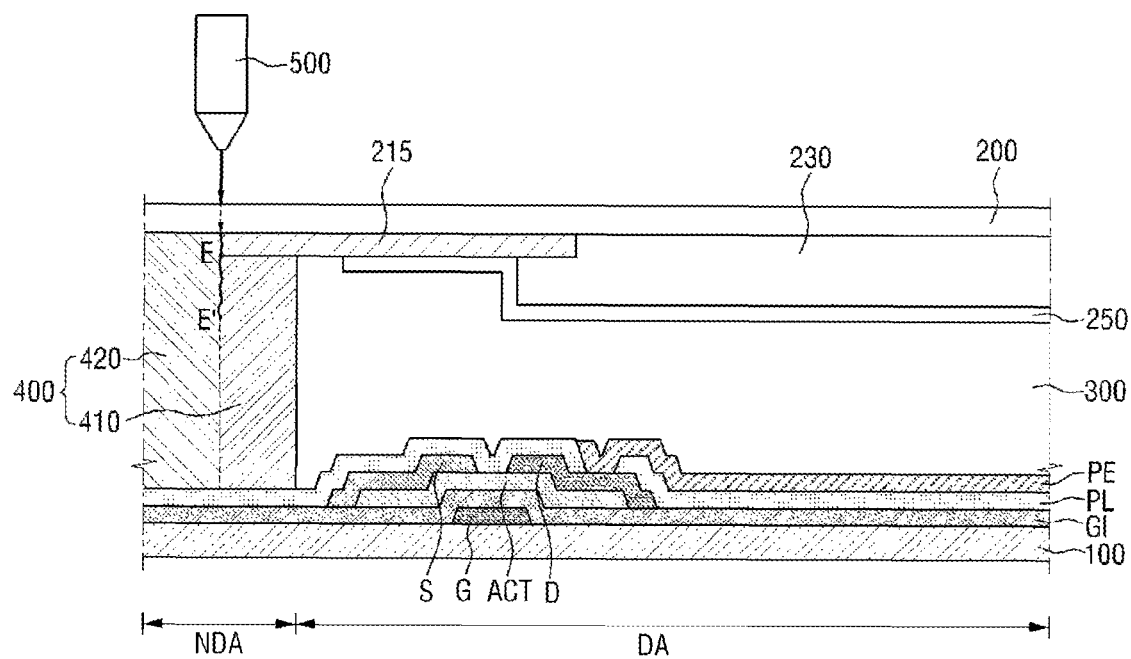
Figure 10:
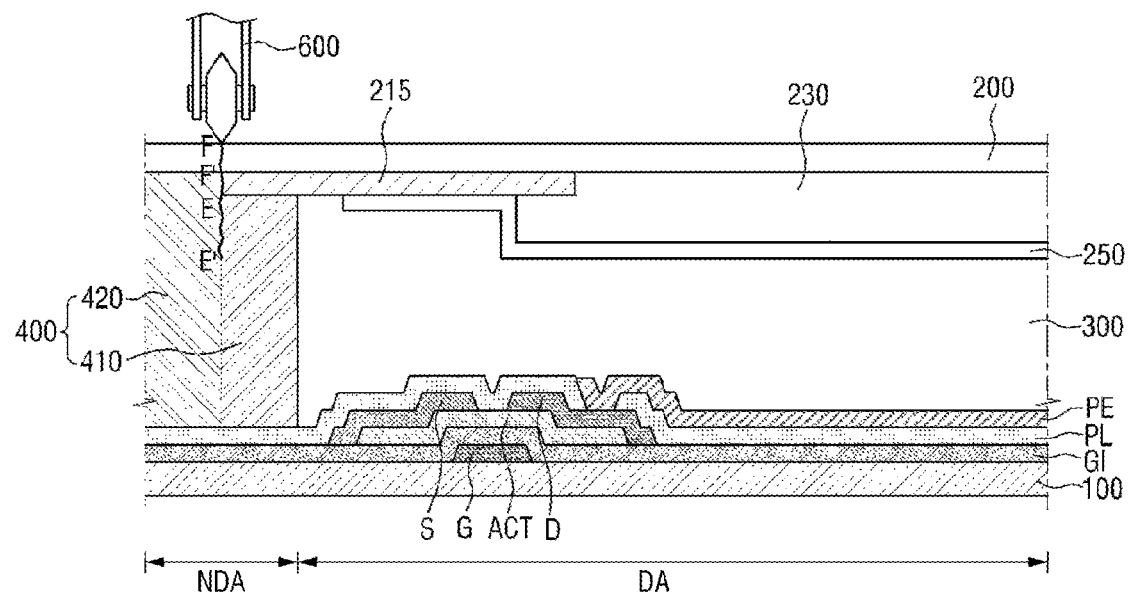
Figure 11:
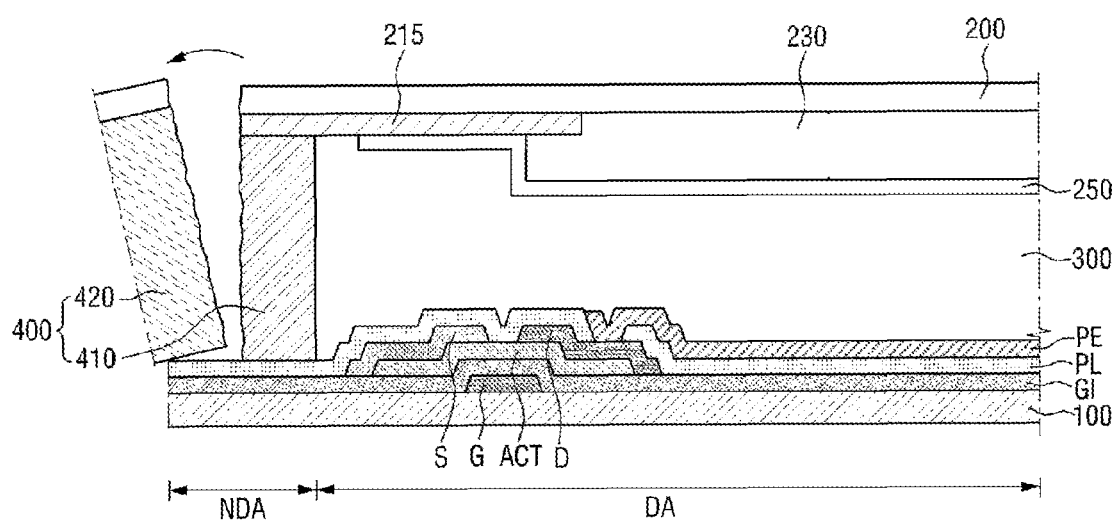

The method for manufacturing a display panel in the case where the black matrix 215 is arranged as described above will be briefly described. Referring to FIG. 9, a crack EE' may be generated in a boundary between the first area 410 and the second area 420, on which the black matrix 215 is not formed, in a direction from the second substrate 200 to the sealant 400. Then, as shown in FIG. 10, a crack FF' may be generated on the second substrate extending to the crack EE' that was previously-generated by operating the cutting wheel 600 on the second substrate. Accordingly, as shown in FIG. 11, the portion of the mother substrate that is intended to be cut can be cut.

Since other configurations may have components similar to those as described above, any duplicate explanation thereof will be omitted for brevity.

The method for manufacturing a display panel as described above with reference to FIGS. 1 to 11 is not limited thereto, and may include other variations. For example, the method may be applied to the area where the drive portion of the display panel is positioned.

Further, a method for manufacturing a display panel to be described hereinafter with reference to FIGS. 12 to 22 may be applied to another area where the drive portion is not positioned, but are not limited thereto. If needed, those skilled in the art may apply the method as described above or the method to be described hereinafter, or may use the methods together.

FIGS. 12 to 15 are cross-sectional views schematically illustrating a method for manufacturing a display panel according to an exemplary embodiment of the present invention.

Figure 12:
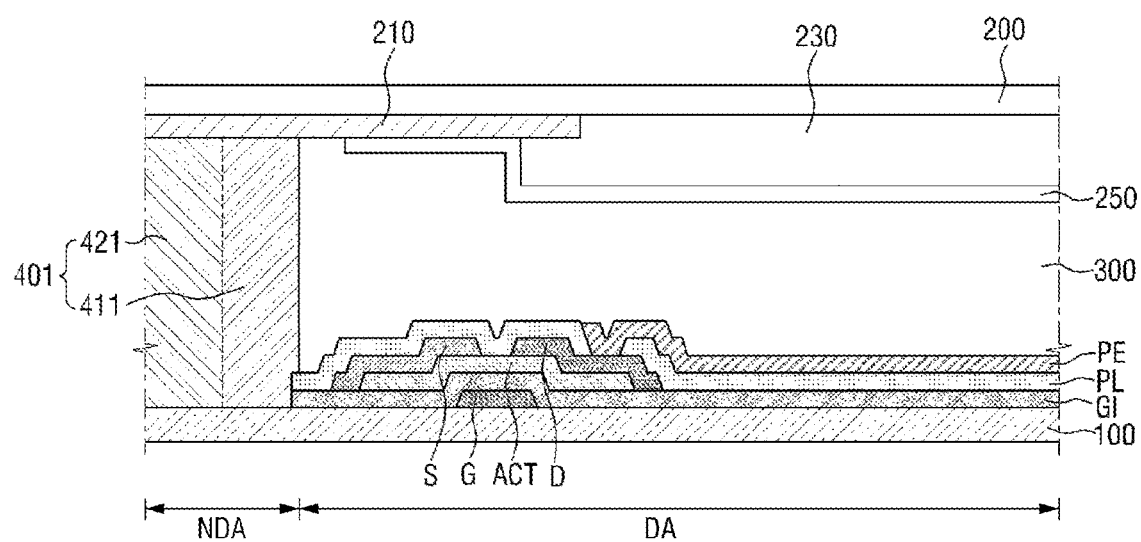
FIGS. 12, 13, 14, and 15 are cross-sectional views schematically illustrating a method for manufacturing a display panel according to another exemplary embodiment of the present invention.

Referring to FIG. 12, the method for manufacturing a display panel according to an exemplary embodiment may include providing the mother substrate which includes the display area DA and the non-display area NDA, and further includes the first substrate 100, the second substrate 200 that faces the first substrate 100, and a sealant 401 formed between the first substrate 100 and the second substrate 200 to seal the substrates. Between the sealant 401 and the first substrate 100, a pixel electrode PE and the gate insulating layer GI may be positioned to partially overlap each other. That is, unlike the display panel illustrated in FIGS. 1 to 11, the sealant 401 may be formed to come in direct contact with the first substrate 100, and parts of the pixel electrode PE and the gate insulating layer GI may come in contact with a part of the sealant 401. Accordingly, only the parts of the first substrate 100, the sealant 401, and the second substrate 200 may be removed through cutting to form the final device.

Since other configurations may have components similar to those as described above, any duplicate explanation thereof will be omitted for brevity.

Figure 13:
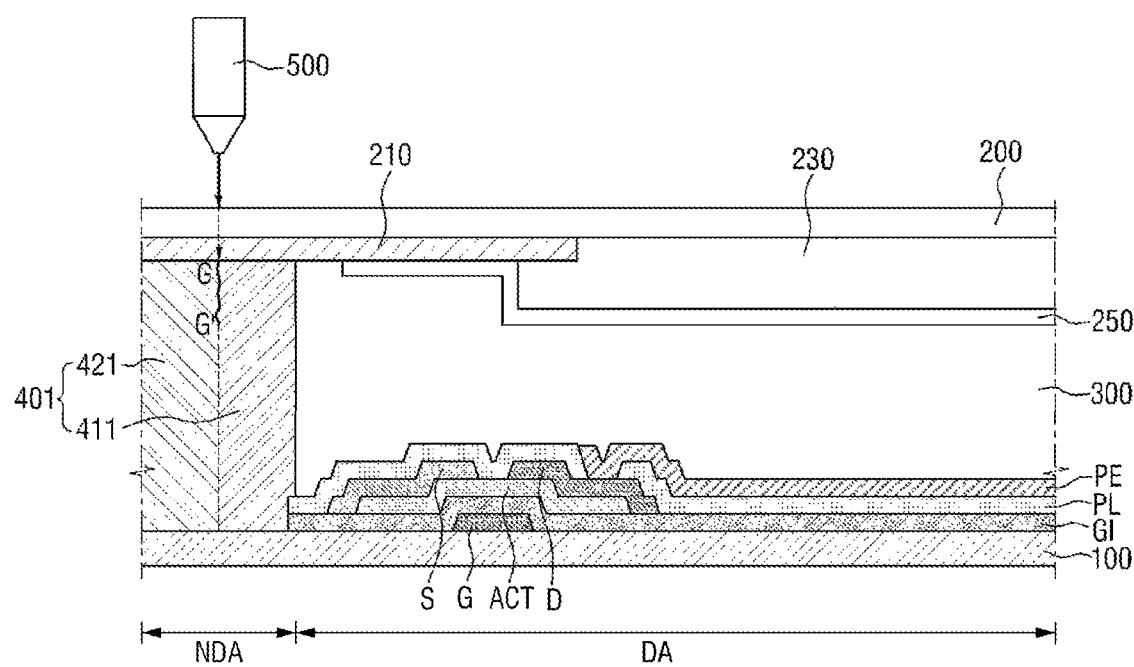

As shown in FIG. 13, the method may include generating the crack in the sealant 401 through irradiation of the laser onto the sealant 401 between the first substrate 100 and the second substrate 200. Through this, a crack GG' may be partially generated on the boundary between the first area 411 and the second area 421 of the sealant.

Figure 14:
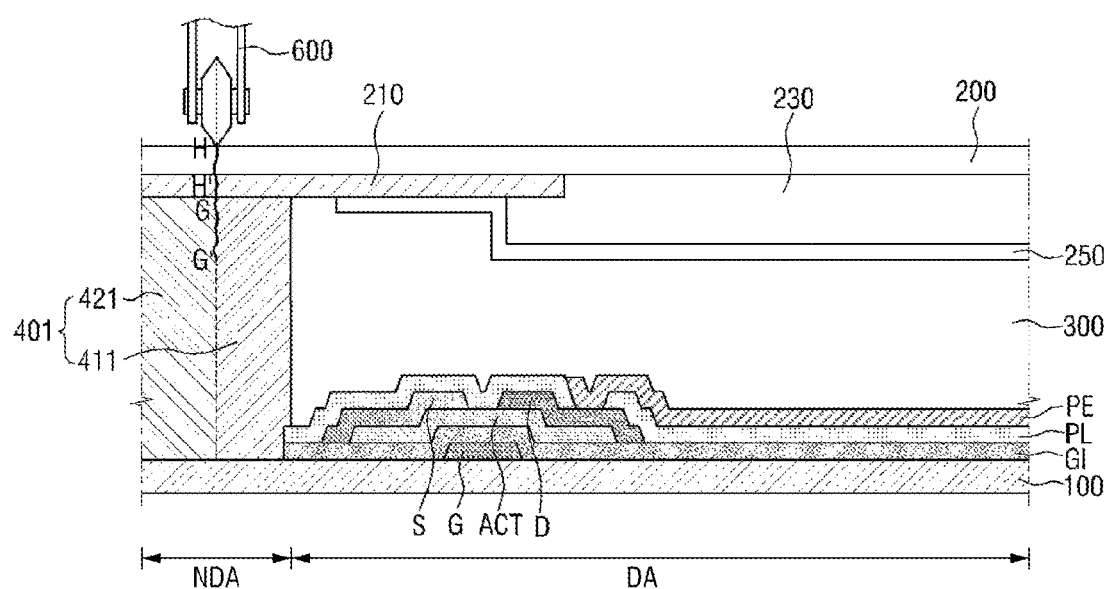

Next, as shown in FIG. 14, the method may include performing cutting from the second substrate 200 toward the sealant 401 using the cutting wheel 600. A part of the second substrate 200, the second area 421 that is a part of the sealant 401, and a part of the first substrate 100 may be cut during this process. The cut portion may be a portion that vertically corresponds to the crack GG' that was previously formed. Referring to FIG. 14, as a crack HH' propagates in the second substrate 200, a part of the second substrate 200 is cut, and the crack HH' may extend to the crack GG' that was previously formed in the sealant 401. Thereafter, along the crack GG' of the sealant, the crack may extend toward the first substrate 100 below the sealant, and the crack may finally propagate from crack GG' to the first substrate 100 to cut a part of the first substrate 100.

Figure 15:
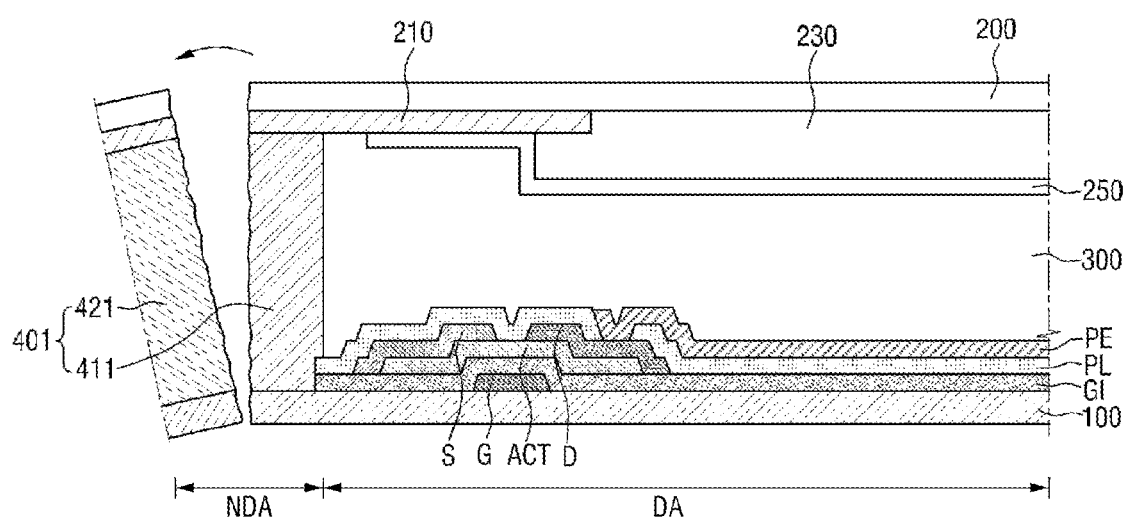
Figure 16:
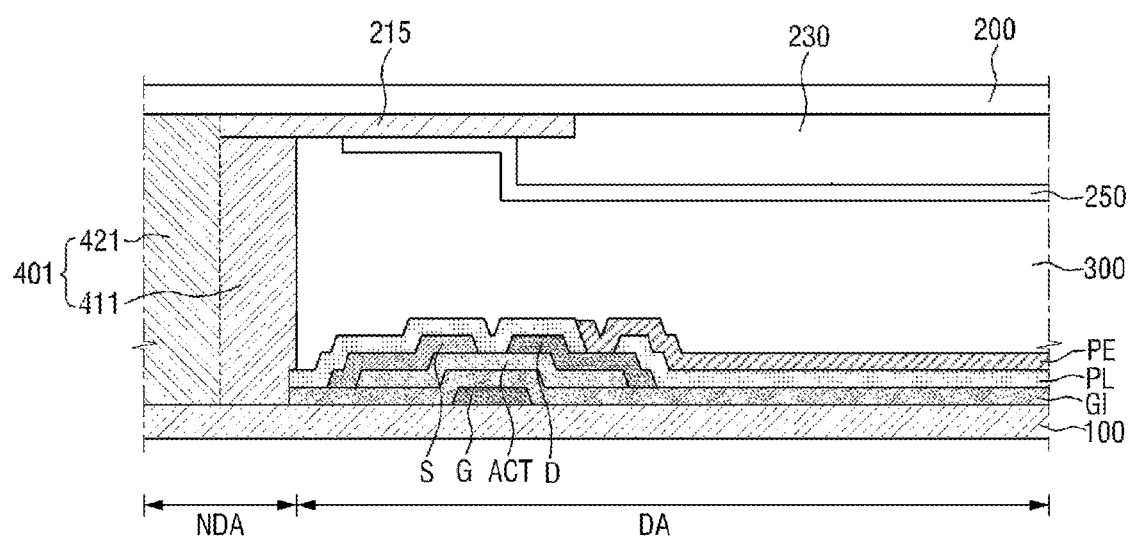
FIGS. 16, 17, 18, and 19 are cross-sectional views schematically illustrating a method for manufacturing a display panel according to another exemplary embodiment of the present invention.

Next, as shown in FIG. 15, a part of the second substrate 200, the second area 421 of the sealant 401, and a part of the first substrate 100 may be removed.

FIGS. 16 to 19 are cross-sectional views schematically illustrating a method for manufacturing a display panel according to an exemplary embodiment of the present invention.

Referring to FIGS. 16 to 19, the black matrix 215 may be formed to cover the area that corresponds to the first area 411 on the sealant 401. That is, the black matrix 215 may cover a part of the display area DA, and may cover the first area 411 on an upper side of the sealant 401, but not the second area 421. Through this, the black matrix may serve as a reference position for the laser irradiation of the second substrate 200, thereby easily irradiating the proper area of the sealant 401 at the boundary portion between the first area 411 and the second area 421.

Figure 17:
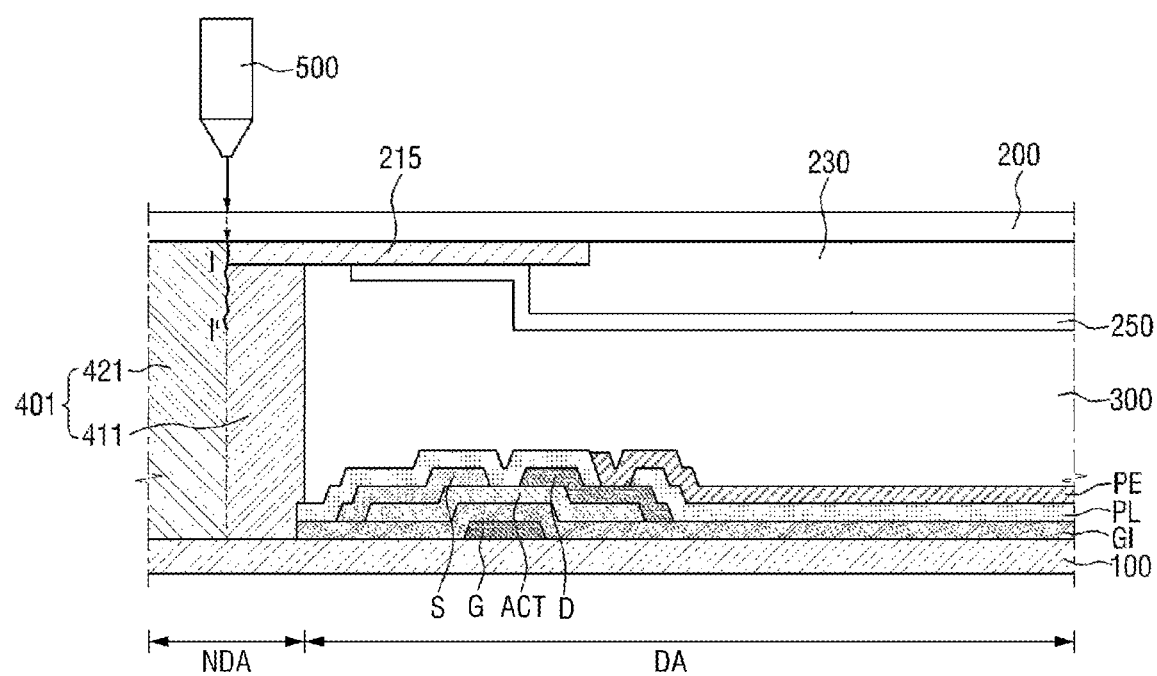

As shown in FIG. 17, the laser may radiate from the second substrate 200 toward the sealant 401 to modify the surface between the sealant 401 and the second substrate 200, generating partial crack II' on the boundary between the first area 411 and the second area 421 of the sealant 401.

Figure 18:
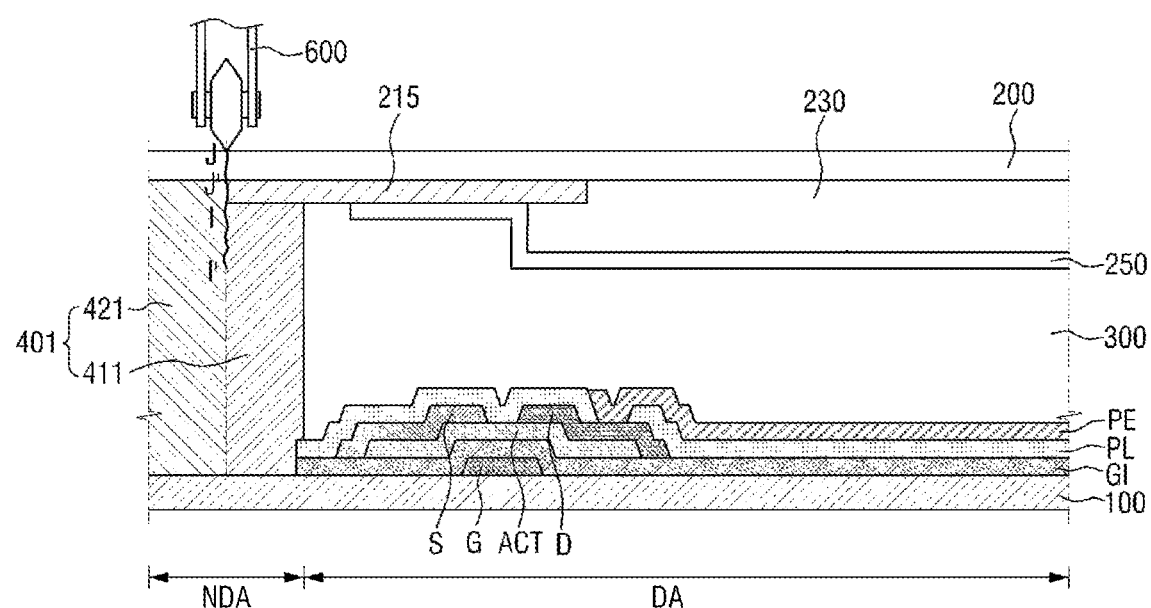
Figure 19:
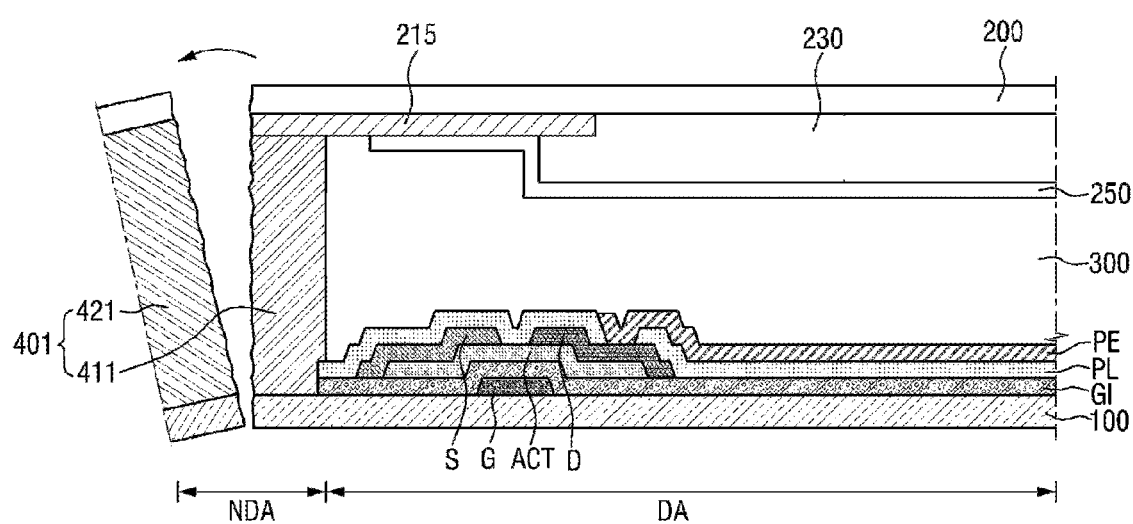

Next, as shown in FIG. 18, a crack JJ' may be propagated from the second substrate by the cutting wheel 600, and as shown in FIG. 19, a part of the second substrate 200, the second area 421 of the sealant 401, and a part of the first substrate 100 may finally be removed.

Since other configurations may have components similar to those as described above, any duplicate explanation thereof will be omitted for brevity.

Figure 20:
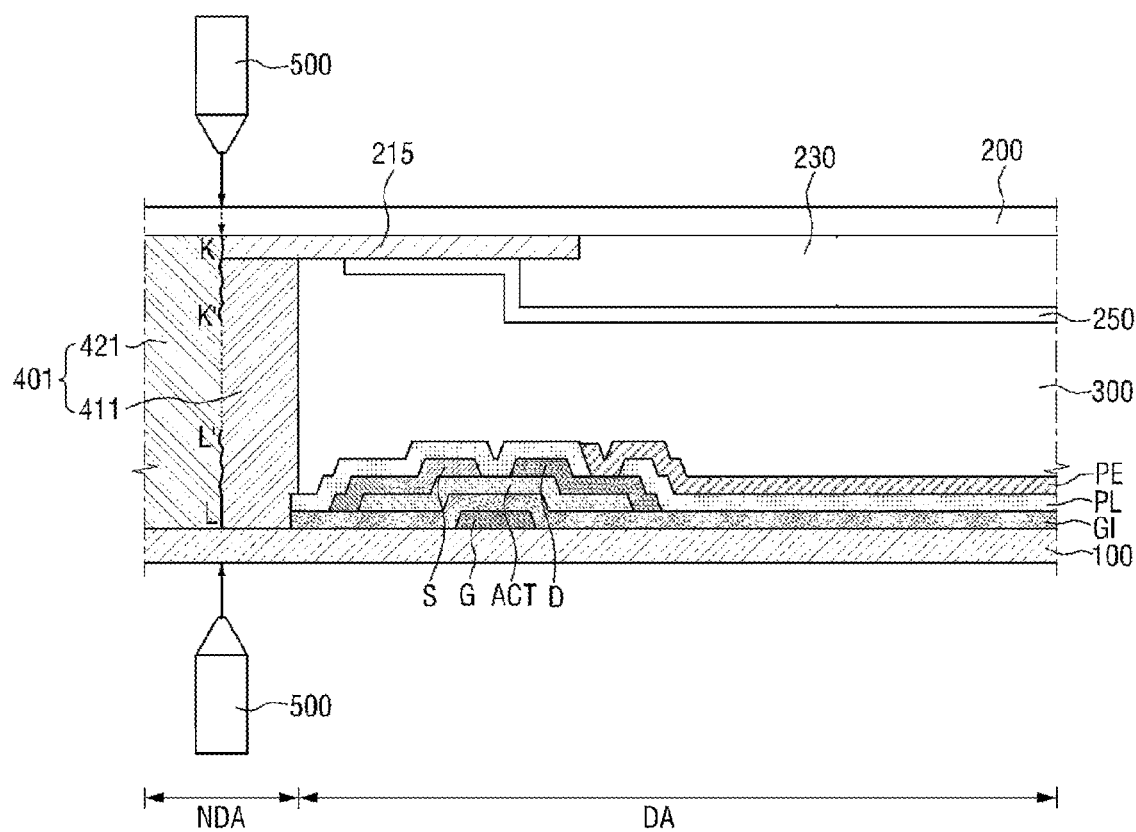
FIGS. 20, 21, and 22 are cross-sectional views schematically illustrating a method for manufacturing a display panel according to another exemplary embodiment of the present invention.
Figure 21:
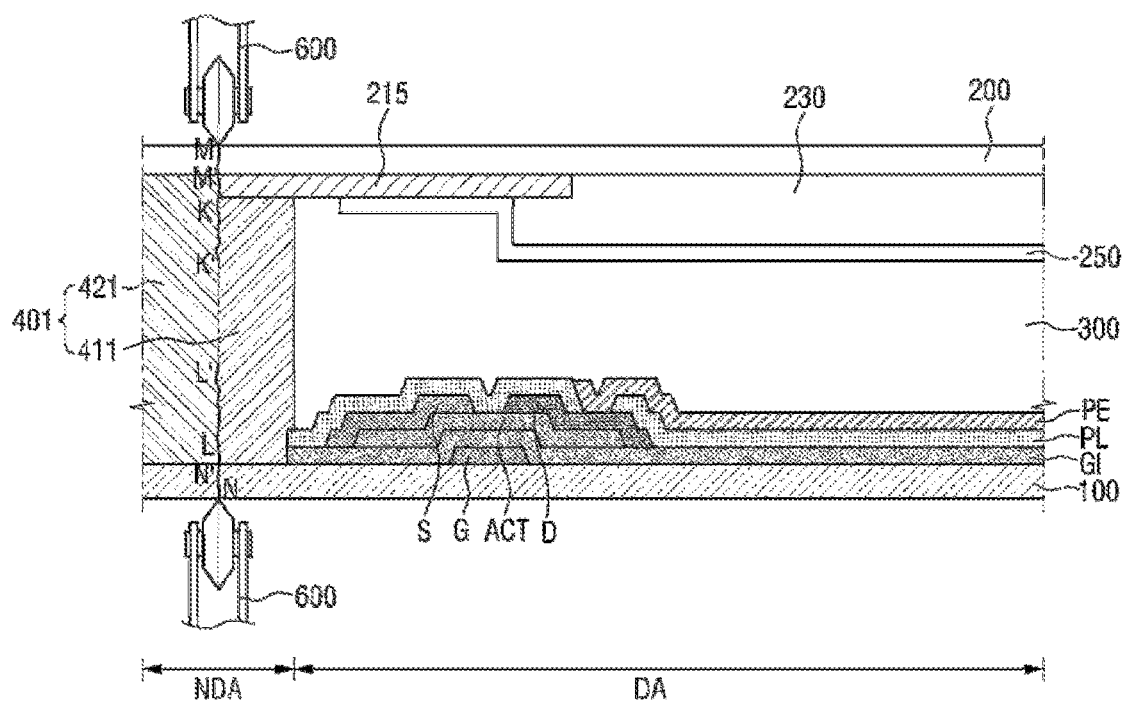
Figure 22:
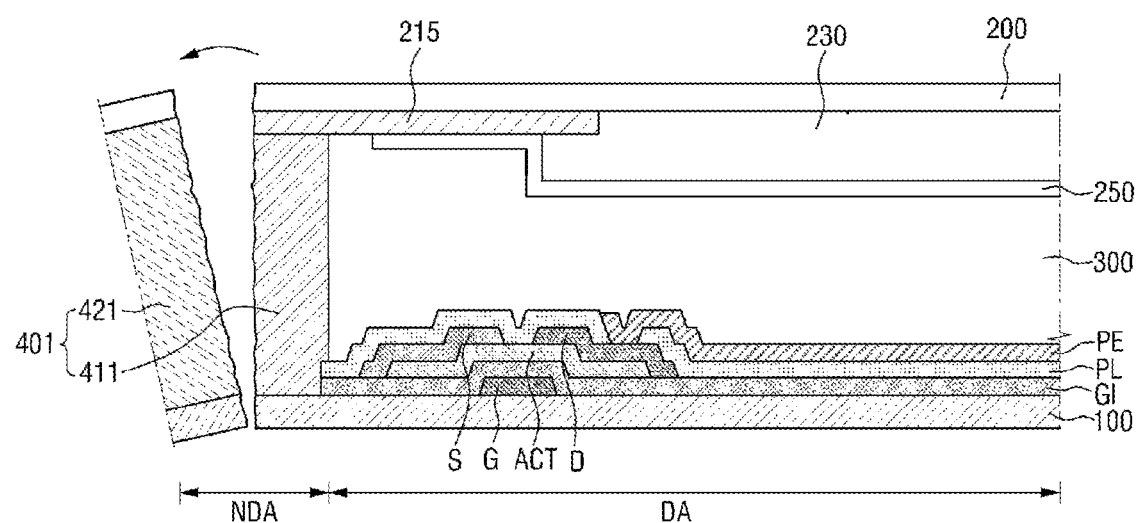

FIGS. 20 to 22 are cross-sectional views schematically illustrating a method for manufacturing a display panel according to an exemplary embodiment of the present invention.

Referring to FIGS. 20 to 22, the generating the crack may be performed through laser irradiation of the boundary between the first area 411 and the second area 421 of the sealant and through laser irradiation from any one of the first substrate 100 and the second substrate 200. That is, the laser 500 may be radiated from any one of the first substrate 100 and the second substrate 200 toward the sealant 401 or from both the first substrate 100 and the second substrate 200. That is, a crack KK' may be formed from the second substrate 200 toward the sealant 401, and a crack LL' may be formed from the first substrate 100 toward the sealant 401.

Next, referring to FIG. 21, cutting using the cutting wheels 600 may be performed to extend the cracks KK' and LL' that have already been formed on the sealant 401 by from at least one of the first substrate 100 and the second substrate 200 toward the inside of the sealant 401. That is, the cutting may be performed on both the first substrate 100 and the second substrate 200 using the cutting wheel 600, and through this, a crack NN' that is generated in the first substrate 100 by the cutting wheel 600 may extend to the crack LL' that is formed in the portion where the first substrate 100 and the sealant 401 come in contact with each other, and a crack MM' that is generated in the second substrate 200 by the cutting wheel 600 may extend to the crack KK' that is formed in the portion where the second substrate 200 and the sealant 401 come in contact with each other. Finally, the cracks LL' and KK' inside the sealant may extend to meet each other. Thus, as shown in FIG. 22, a part of the first substrate 100, the second area 421 of the sealant 401, and a part of the second substrate 200 may be removed.

Since other configurations may have components similar to those as described above, any duplicate explanation thereof will be omitted for brevity.

According to exemplary embodiments of the present invention, a display panel that is manufactured by the method for manufacturing a display panel as described above and a display device including such a display panel may be provided.

Hereinafter, although not separately illustrated in the drawing, a display device according to exemplary embodiments of the present invention will be briefly illustrated.

A display device may include a display panel including the first substrate, the second substrate, the liquid crystal layer, and the sealant as described above, a backlight unit positioned on a lower portion of the first substrate of the display panel to emit light, a lower polarizing plate positioned on a lower portion of the display panel, and an upper polarizing plate positioned on an upper portion of the display panel.

The upper polarizing plate and the lower polarizing plate may be a PVA-based polarizing film in which dichroic dyes are dyed and cultured or a wire grid polarizer. Further, permeation axes of the upper polarizing plate and the lower polarizing plate may be orthogonal or parallel to each other.

According to circumstances, one of the upper polarizing plate and the lower polarizing plate may be omitted.

Although not specifically illustrated, the backlight unit may further include, for example, a light guide plate, a light source portion, a reflective member, and an optical sheet.

The light guide plate (LGP) is a portion that changes a path of light that is emitted from the light source portion to the liquid crystal layer side, and may be provided with a light incident surface provided to make the light that is generated from the light source portion incident thereto and a light emission surface toward the liquid crystal layer. The light guide plate may be made of a material having a predetermined refractive index, such as PMMA (Poly Methyl Methacrylate) or PC (Polycarbonate) that is one of light permeable materials, but is not limited thereto.

Since the light that is incident to one side or both sides of the light guide plate made of the above-described material has an angle that is within the critical angle of the light guide plate, the light is incident to the inside of the light guide plate, and the angle of the light secedes from the critical angel when the light is incident to the upper surface or lower surface of the light guide plate. Accordingly, the light is not emitted to an outside of the light guide plate, but is uniformly transferred to the inside of the light guide plate.

A scattering pattern may be formed on any one of the upper and lower surfaces of the light guide plate, for example, on the lower surface that faces the light emission surface, to emit the guided light upward. That is, the scattering pattern may be printed on one surface of the light guide plate, for example, by ink, so that the light that is transferred from the inside of the light guide plate is emitted upward. The scattering pattern may be formed through ink printing, but is not limited thereto. Fine grooves or projections may be formed on the light guide plate, and various modifications thereof can be made.

A reflective member may be further provided between the light guide plate and a bottom portion of a lower accommodation member. The reflective member serves to re-reflect the light that is emitted to an opposite surface that faces the light emission surface to supply the reflected light to the light guide plate. The reflective member may be in a film shape, but is not limited thereto.

The light source portion may be arranged to face the light incident surface of the light guide plate. The number of light source portions can be appropriately changed as needed. For example, only one light source portion may be provided on only one side surface of the light guide plate, or three of more light source portions may be provided to correspond to three or more side surfaces among four side surfaces of the light guide plate. Further, a plurality of light source portions may be arranged to correspond to any one of side surfaces of the light guide plate. Although a side light type in which the light sources are positioned on the side surface of the light guide panel has been described as an example, a direct-illumination type or a surface-shaped light source type may be provided depending on the backlight configuration.

The light source may include a white LED that emits white light or a plurality of LEDs that emit light of red (R), green (G), and blue (B) colors. In the case where the plurality of light sources are implemented by LEDs that emit light of red (R), green (G), and blue (B) colors, they may be turned on at the same time to implement the white light through color mixing.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for manufacturing a display panel, comprising:
   providing a mother substrate having a display area and a non-display area and comprising:
      disposing a second substrate on a first substrate facing and spaced apart from the first substrate;
      disposing a sealant between the first substrate and the second substrate in the non-display area to form a seal;
   irradiating the sealant with a laser to generate a crack in the sealant; and
   cutting the second substrate and the sealant at a location on the second substrate corresponding to the crack, wherein:
   the sealant comprises a second area that is positioned at the edges of the mother substrate and a first area that is positioned inside the second area,
   the cutting comprises removing the second area, and
   the laser irradiation of the sealant occurs at a boundary between the first area of the sealant and the second area of the sealant.

2. The method of claim 1,
   wherein the display panel comprises a black matrix disposed on a surface of the second substrate that faces the first substrate, and
   wherein the black matrix is disposed in a position corresponding to the sealant.

3. The method of claim 1, wherein the sealant is disposed in an edge region of the first substrate and the second substrate.

4. The method of claim 1, wherein the laser irradiation comprises laser irradiation of the second substrate.

5. The method of claim 1,
   wherein the first substrate comprises a drive portion disposed in the non-display area configured to drive the display panel, and
   wherein a part of the second substrate and a part of the sealant on the drive portion are removed by the cutting.

6. The method of claim 1,
   wherein the display panel comprises a black matrix disposed on a surface of the second substrate that faces the first substrate, and
   wherein the black matrix is disposed on an upper side of the first area on the sealant, but not an upper side of the second area of sealant.

7. The method of claim 1, further comprising:
   extending the crack in the sealant from the second substrate toward the first substrate.

8. The method of claim 1, wherein the laser irradiation of the sealant modifies an adhesive force between the sealant and the second substrate.

9. A method for manufacturing a display panel, comprising:
   providing a mother substrate having a display area and a non-display area and comprising:
      disposing a second substrate on a first substrate facing and spaced apart from the first substrate;
      disposing a sealant between the first substrate and the second substrate in the non-display area to form a seal;
   irradiating the sealant with a laser to generate a crack in the sealant; and cutting the second substrate and the sealant at a location on the second substrate corresponding to the crack, wherein the laser irradiation of the sealant generates the crack from a surface of the sealant contacting the second substrate toward the first substrate.

10. A method for manufacturing a display panel, comprising:

providing a mother substrate having a display area and a non-display area and comprising:

disposing a second substrate on a first substrate facing and spaced apart from the first substrate;

disposing a sealant between the first substrate and the second substrate in the non-display area to form a seal;

irradiating the sealant with a laser to generate a crack in the sealant; and cutting the second substrate, the sealant, and the first substrate at a location corresponding to the crack.

11. The method of claim 10, wherein at least one of the first substrate and the second substrate comprises a light permeable material.

12. The method of claim 10, wherein the laser irradiation modifies an adhesive force between the sealant and the first substrate or the second substrate by laser irradiation of the sealant.

13. The method of claim 10, wherein the laser irradiation of the sealant occurs from at least one of the first substrate and the second substrate toward the sealant.

14. The method of claim 10, wherein:

the sealant comprises a second area that is positioned at an edge of the mother substrate and a first area that is positioned inside the second area, and a black matrix is disposed on a surface of the second substrate that faces the first substrate and is disposed on an upper side of the first area on the sealant, but not an upper side of the second area of sealant.

15. The method of claim 14, wherein the laser irradiation of the sealant occurs at a boundary between the first area and the second area of the sealant, and the laser radiates from at least one of the first substrate and the second substrate toward the boundary.

16. The method of claim 15, further comprising:

extending the crack in the sealant towards at least one of the first substrate and the second substrate.

17. The method of claim 16, wherein the cutting comprises extending the crack that is formed on the sealant by a cutting wheel from at least one of the first substrate and the second substrate toward an inside of the sealant.

18. The method of claim 10, wherein the laser irradiation modifies an adhesive force between the sealant and the first substrate and between the sealant and the second substrate by laser irradiation of the sealant.

* * * * *